(12) United States Patent
Lee

(10) Patent No.: US 11,142,055 B2
(45) Date of Patent: Oct. 12, 2021

(54) HOOD WEATHER STRIP ASSEMBLY

(71) Applicants: Hyundai Motor Company, Seoul (KR); Kia Motors Corporation, Seoul (KR)

(72) Inventor: Seong-Muk Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 155 days.

(21) Appl. No.: 16/439,358

(22) Filed: Jun. 12, 2019

(65) Prior Publication Data

US 2020/0130490 A1    Apr. 30, 2020

(30) Foreign Application Priority Data

Oct. 30, 2018 (KR) .......................... 10-2018-0130606

(51) Int. Cl.
| | | |
|---|---|---|
| *B60J 10/84* | (2016.01) | |
| *B62D 25/12* | (2006.01) | |
| *B60J 10/23* | (2016.01) | |
| *B60J 10/50* | (2016.01) | |

(52) U.S. Cl.
CPC ........... *B60J 10/84* (2016.02); *B60J 10/2335* (2016.02); *B60J 10/50* (2016.02); *B62D 25/12* (2013.01)

(58) Field of Classification Search
USPC ......................................... 296/192; 49/498.1
See application file for complete search history.

(56) References Cited

U.S. PATENT DOCUMENTS

| | | | | |
|---|---|---|---|---|
| 4,956,941 | A * | 9/1990 | Vaughan | .................. B60R 1/06 49/440 |
| 6,802,666 | B1 * | 10/2004 | Bormann | ................. B60J 10/21 403/233 |
| 8,573,682 | B2 * | 11/2013 | Oomen | .................... B60J 10/84 296/192 |
| 9,528,750 | B2 * | 12/2016 | Eckartsberg | .......... F25D 23/087 |
| 9,731,776 | B1 * | 8/2017 | Shen | ...................... F16J 15/027 |
| 10,800,228 | B2 * | 10/2020 | Gardynik | ................. B60H 1/28 |
| 2003/0173748 | A1 * | 9/2003 | Bormann | ................. B60J 10/21 277/628 |
| 2006/0202516 | A1 * | 9/2006 | Mori | ........................ B60S 1/52 296/192 |
| 2006/0226681 | A1 * | 10/2006 | Kelly | ................... B62D 25/081 296/192 |
| 2009/0261621 | A1 * | 10/2009 | Usuda | .................. B62D 25/081 296/192 |
| 2011/0115257 | A1 * | 5/2011 | Kim | ..................... B62D 25/081 296/192 |
| 2011/0115261 | A1 * | 5/2011 | Platt | ........................ B60J 10/30 296/208 |
| 2013/0221705 | A1 * | 8/2013 | Sugishima | ............. B62D 25/24 296/192 |

(Continued)

FOREIGN PATENT DOCUMENTS

| | | | | |
|---|---|---|---|---|
| GB | 1460169 A | * 12/1976 | ........... | E06B 7/2309 |
| KR | 10-2016-0099260 A | 8/2016 | | |

*Primary Examiner* — Marcus Menezes
(74) *Attorney, Agent, or Firm* — Mintz Levin Cohn Ferris Glovsky and Popeo, P.C.; Peter F. Corless

(57) ABSTRACT

A hood weather strip assembly is provided. The assembly includes a center strip that is fixed to a cowl top cover and a pair of side strips that are coupled to each end of the center strip and fixed to fender side covers, respectively.

4 Claims, 12 Drawing Sheets

(56) References Cited

U.S. PATENT DOCUMENTS

| | | | | |
|---|---|---|---|---|
| 2014/0375084 A1* | 12/2014 | Le Roy | ................ | B62D 25/081 |
| | | | | 296/192 |
| 2015/0068128 A1* | 3/2015 | Baxter | .................... | B60J 10/24 |
| | | | | 49/480.1 |
| 2015/0367716 A1* | 12/2015 | Baxter | .................... | B60J 10/70 |
| | | | | 296/192 |
| 2017/0259856 A1* | 9/2017 | An | ....................... | B62D 25/081 |

* cited by examiner

HOOD WEATHER STRIP ASSEMBLY

CROSS-REFERENCE(S) TO RELATED APPLICATIONS

This application claims priority to Korean Patent Application No. 10-2018-0130606, filed on Oct. 30, 2018, which is incorporated herein by reference in its entirety.

BACKGROUND

Field of the Disclosure

The present disclosure relates to a hood weather strip assembly, and more particularly, to a hood weather strip assembly that is attached to a vehicle hood to improve sealing performance.

Description of Related Art

A cowl top cover corresponds to a front panel connected to a lower end of the front glass of a vehicle. The cowl top cover includes a hood weather strip to prevent the gas generated in an engine room from flowing into the vehicle and to prevent rainwater from entering the engine room. In addition, the hood weather strip prevents introduction of noise or the like into the vehicle, which is caused by friction between the vehicle and the air.

Typically, the hood weather strip is disposed between the front upper surface of the cowl top cover and the rear lower surface of the hood, and is also fixedly coupled to the upper surface of the cowl top cover and the upper surfaces of fender side covers disposed at both sides of the cowl top cover as illustrated in FIG. 1 of the related art. When the conventional hood weather strip are divided into two weather strips 1 and 2 coupled to each other, the weather strips 1 and 2 are simply covered as shown in FIG. 2 illustrating portion A of FIG. 1 according to the related art.

Particularly, the structure in which the weather strips 1 and 2 are simply covered is disadvantageous in sealing performance of the hood weather strip, and may cause dynamic behavior of the hood due to the lack of robustness of the overlapped portion of two weather strips. The conventional weather strip is manufactured by extruding a rubber material for sealing performance and elasticity and bonding end pieces to both ends thereof with polyurethane (PU) foaming agents.

The foregoing is intended merely to aid in the understanding of the background of the present disclosure, and is not intended to mean that the present disclosure falls within the purview of the related art that is already known to those skilled in the art.

SUMMARY

An exemplary embodiment of the present disclosure provides a hood weather strip assembly capable of enhancing sealing performance and robustness at a coupling part between hood weather strips. Other objects and advantages of the present disclosure may be understood by the following description, and become apparent with reference to the exemplary embodiments of the present disclosure. Additionally, it is obvious to those skilled in the art to which the present disclosure pertains that the objects and advantages of the present disclosure may be realized by the means as claimed and combinations thereof.

In accordance with an exemplary embodiment of the present disclosure, a hood weather strip assembly may include a center strip fixed to a cowl top cover, and a pair of side strips coupled to both ends of the center strip and fixed to fender side covers, respectively. The center strip may include a center body and center coupling parts formed at both ends of the center body, the center coupling parts being open laterally. Each of the center coupling parts may have the same outer peripheral shape as the center body. The center coupling part may include a guide protrusion that protrudes from an inner side thereof.

Each of the side strips may include a side body, and a side coupling part formed at a first end of the side body to be coupled to an associated one of the center coupling parts. The side coupling part may include a coupling body having the same outer peripheral shape as the side body, and a coupling insert that protrudes laterally from one side of the coupling body, having an outer periphery smaller than the coupling body, and inserted into the associated center coupling part. The coupling insert may be chamfered.

The hood weather strip assembly may further include an end piece formed integrally with a second end of the side body by injection molding. Alternatively, each of the side strips may include a side body and side coupling parts formed at both ends of the side body, the side coupling parts being open laterally. Each of the side coupling parts may have the same outer peripheral shape as the side body. The center strip may include a center body, and a center coupling part formed at one end of the center body to be coupled to an associated one of the side coupling parts. The center coupling part may include a coupling body having the same outer peripheral shape as the center body, and a coupling insert that protrudes laterally from one side of the coupling body, having an outer periphery smaller than the coupling body, and inserted into the associated side coupling part.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The accompanying drawings for illustrating exemplary embodiments of the present disclosure should be referred to gain a sufficient understanding of the present disclosure, the merits thereof, and the objectives accomplished by the implementation of the present disclosure. In the exemplary embodiments of the present disclosure, techniques well known in the art or repeated descriptions may be reduced or omitted to avoid obscuring appreciation of the disclosure by a person of ordinary skill in the art.

Figure 1:
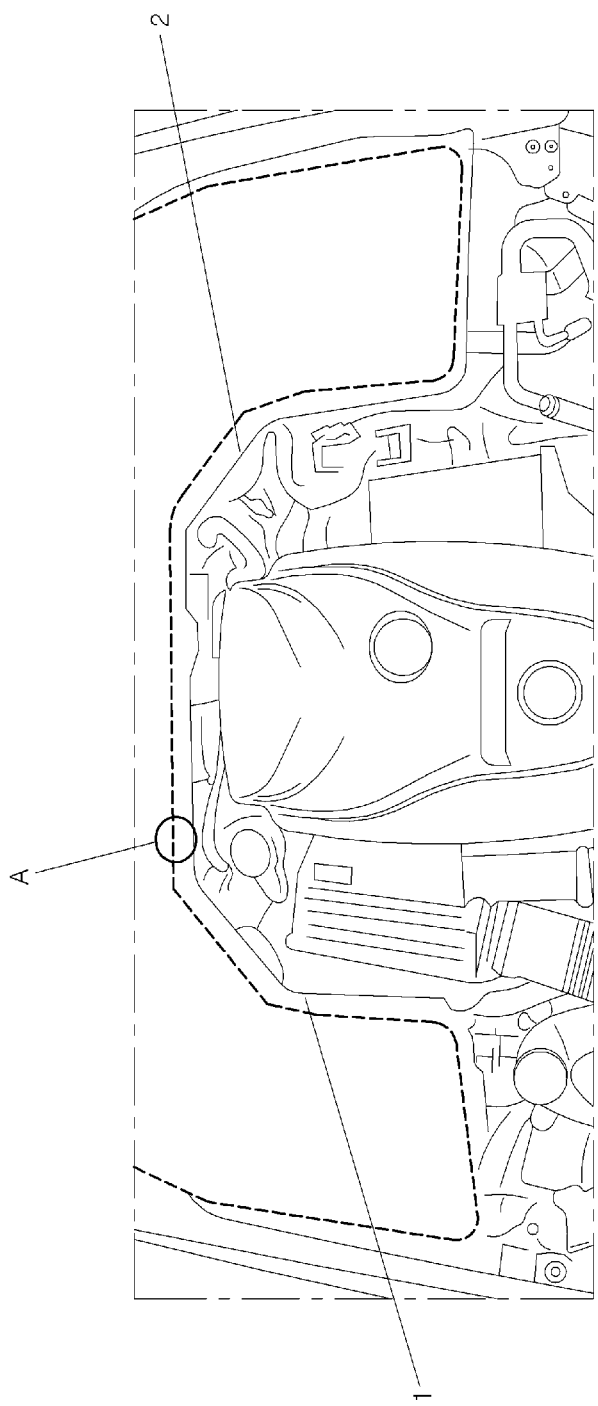
FIGS. 1 and 2 illustrate a conventional hood weather strip according to the related art.
Figure 2:
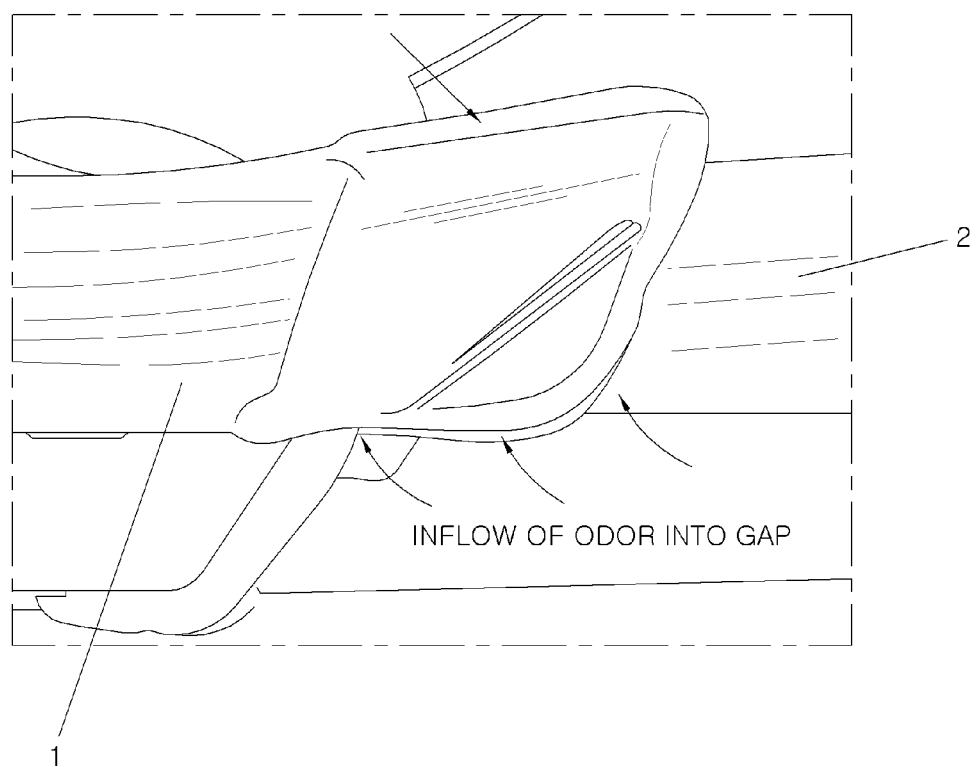
Figure 3:
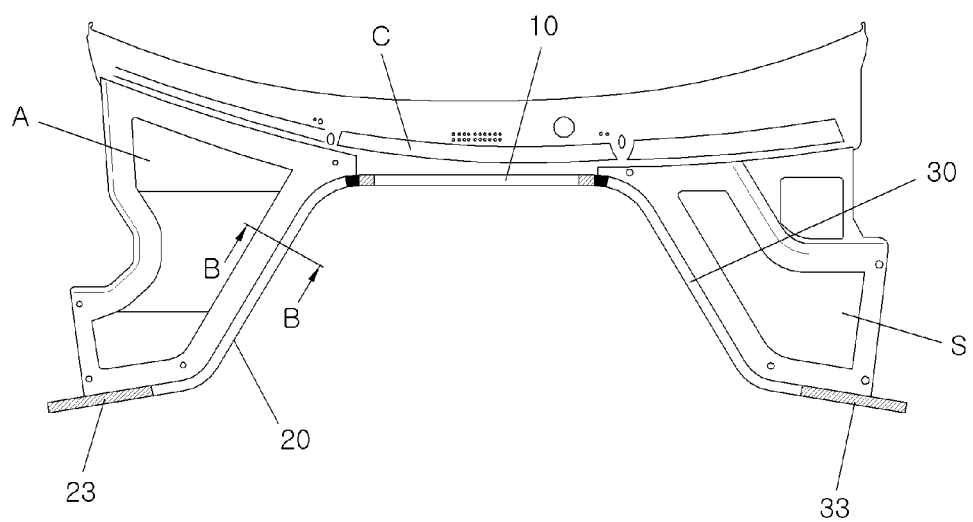
FIG. 3 illustrates a hood weather strip assembly according to an exemplary embodiment of the present disclosure.
Figure 4:
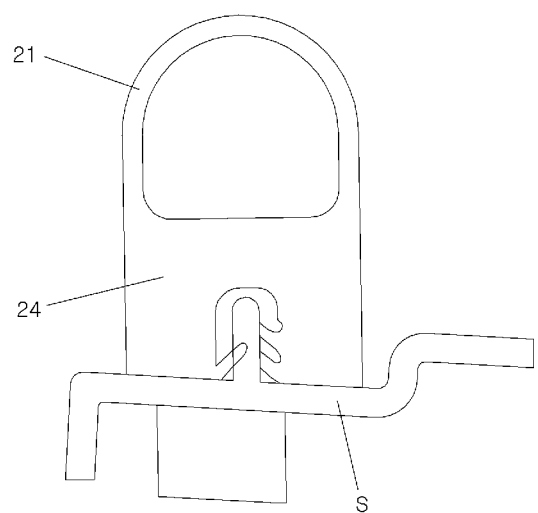
FIG. 4 is a cross-sectional view taken along line B-B of FIG. 3 according to an exemplary embodiment of the present disclosure.
Figure 5:
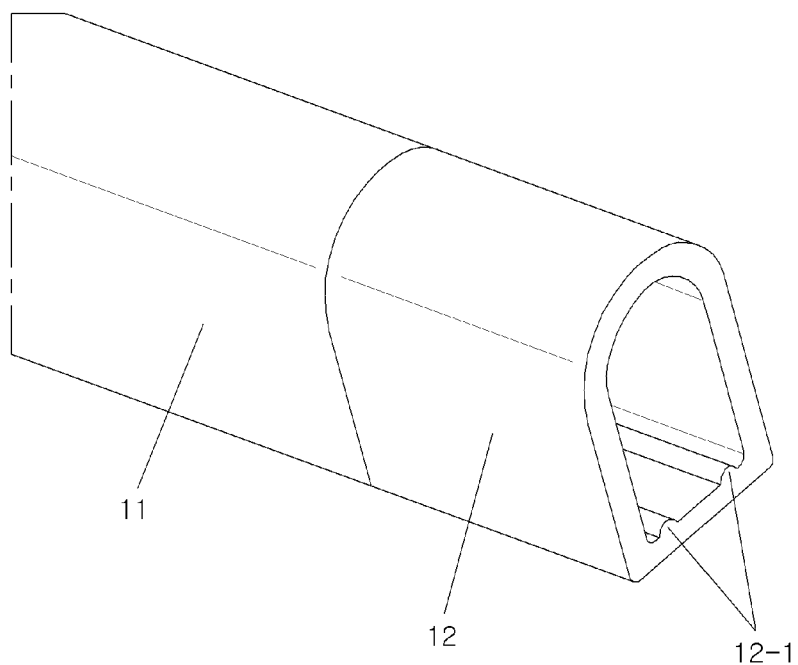
FIG. 5 partially illustrates a center strip according to an exemplary embodiment of the present disclosure.
Figure 6:
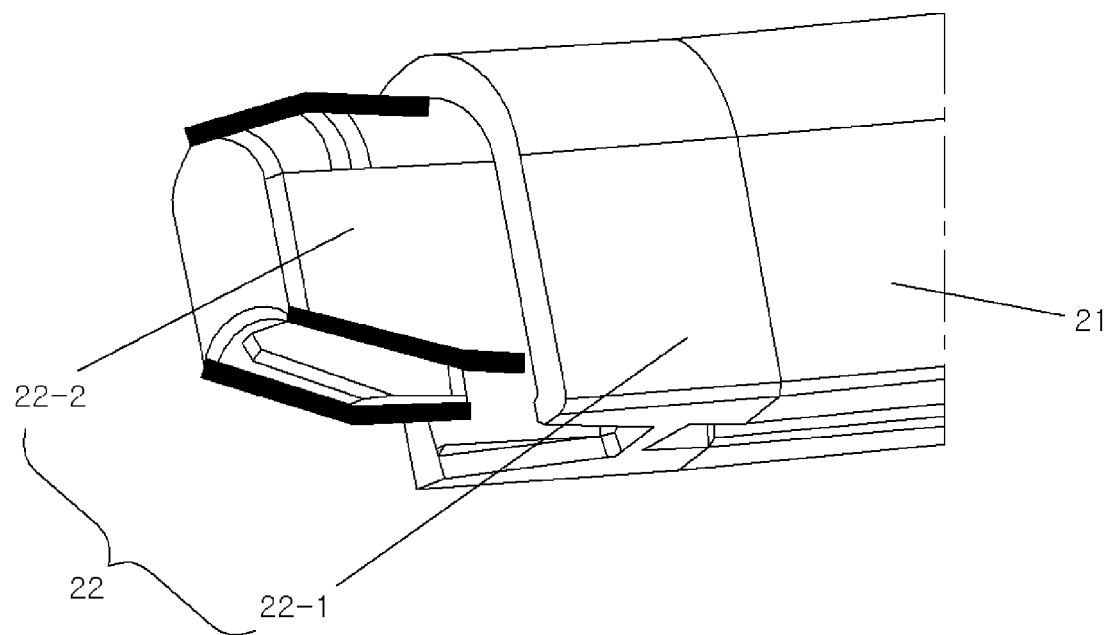
FIG. 6 partially illustrates a side strip according to an exemplary embodiment of the present disclosure.
Figure 7:
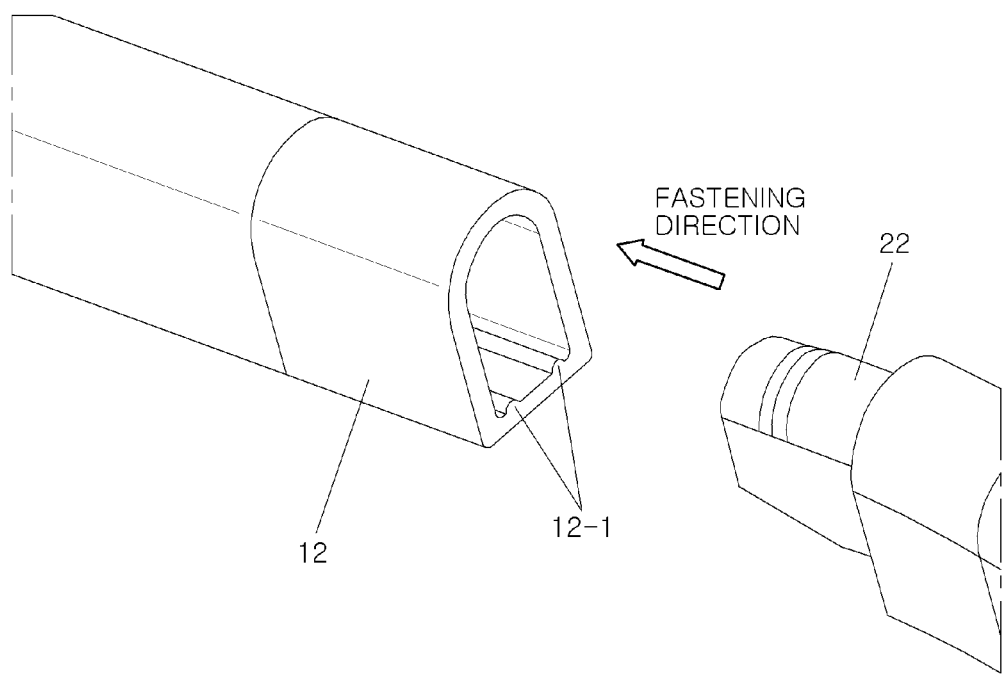
FIG. 7 illustrates coupling between the center strip and the side strip according to an exemplary embodiment of the present disclosure.

FIG. 3 illustrates a hood weather strip assembly according to an exemplary embodiment of the present disclosure. FIG. 4 is a cross-sectional view taken along line B-B of FIG. 3. FIG. 5 partially illustrates a center strip which is one component of the present disclosure. FIG. 6 partially illustrates a side strip which is one component of the present disclosure. FIG. 7 illustrates coupling between the center strip and the side strip of the present disclosure.

Hereinafter, the hood weather strip assembly according to the exemplary embodiment of the present disclosure will be described with reference to FIGS. 3 to 7. The hood weather strip assembly of the present disclosure may have improved sealing performance and enhanced robustness since it is not structured to simply cover two weather strips.

Accordingly, the hood weather strip assembly according to the exemplary embodiment of the present disclosure may include a center strip 10 fixedly coupled to the upper surface of a cowl top cover C, and a pair of side strips 20 and 30 coupled to both ends of the center strip 10 (e.g., the side strips are coupled to each of the center strip ends, respectively) and fixed to the upper surfaces of respective fender side covers S. For example, the side strip 20 may be coupled to a first end of the center strip 10 and the side strip 30 may be coupled to a second end of the center strip 10. The side strips 20 and 30 includes end pieces 23 and 33 formed at the ends thereof, respectively. For example, the end piece 23 (e.g., first end piece) may be formed at the end of the side strip 20 (e.g., a first side strip) and the end piece 33 (e.g., second end piece) may be formed at the end of the side strip 30 (e.g., a second side strip).

Each of the center strip 10 and the side strips 20 and 30 has a body and a fixing part coupled to an associated one of the cowl top cover C and the fender side covers S at the lower portion of the body. In other words, as shown in FIG. 4 illustrating the section B-B of FIG. 3, the side strip 20 may include, for example, a side body 21 made of a material such as an ethylene propylene diene monomer (EPDM) or other type of rubber having a predetermined elastic force and sealing property to seal the space between the lower surface of the hood and the upper surface of the fender side cover S during contact with the hood. The side body 21 may have a hollow defined therein to further improve an elastic force and a sealing property.

The side strip 20 may further include a fixing part 24 made of hard rubber and a groove formed upward from the lower surface thereof. The fixing part 24 may be coupled to the fender side cover S by inserting a protrusion formed on the fender side cover S into the groove of the fixing part 24. The structure of the body and fixing part is the same as that of the center strip. The assembly of the present disclosure is configured such that the pair of side strips 20 and 30 are not covered by the center strip 10 but are coupled to the center strip 10. Accordingly, the center strip 10 may include a center body 11 and center coupling parts 12 formed at both ends of the center body 11, and each of the side strips 20 and 30 may include a side body 21 and a side coupling part 22.

FIGS. 5 to 7 illustrate only one of the side strips 20 and 30, merely for illustrative purposes but the configuration is the same for both side strips. In particular, the side coupling part 22 of the side strip 20 may be formed at a first side of the side body 21, and the end piece 23 may be formed at a second side of the side body 21. The center strip 10 may be coupled to the pair of side strips 20 and 30 via the center body 11, which has a sealing property and an elastic force and may be fixed to the cowl top cover C, and the center coupling parts 12 formed at both ends thereof. Each of the center coupling parts 12 may be laterally penetrated for coupling with the side coupling part 22 of the side strip 20 and has the same outer peripheral shape as the center body 11.

As illustrated in FIG. 5, the center coupling part 12 may include a guide protrusion 12-1 that protrudes from the inner lower surface of the center coupling part 12 for coupling with the side coupling part 22. The guide protrusion 12-1 may be separated if necessary. The side strip 20 may include the side body 21, which has a sealing property and an elastic force and may be fixed to the fender side cover S, the side coupling part 22 formed at the first end of the side body 21, and the end piece 23 formed at the second end of the side body 21, and may be coupled to the center strip 10 by the side coupling part 22.

The side body 21 may have a flatly bent shape (e.g., bent with straight sides) that corresponds to the fender side cover S as illustrated in the drawing. Additionally, the side coupling part 22 may include a coupling body 22-1 having the same outer peripheral shape as the side body 21, and a coupling insert 22-2 that protrudes laterally from one side of the coupling body 22-1 and has an outer periphery that is smaller than the coupling body 22-1, and the coupling insert 22-2 may be inserted into the associated center coupling part 12.

Since the coupling insert 22-2 protrudes laterally from one side of the coupling body 22-1, the outer periphery of the coupling insert 22-2 has a size that corresponds to the inner periphery of the center coupling part 12. Therefore, when the center strip 10 is coupled to the side strip 20 as in FIG. 7, the coupling insert 22-2 may be fully inserted into the center coupling part 12 to prevent exposure to the outside and thus, the center coupling part 12 and the coupling body 22-1 may be integrated in appearance due to the same outer peripheral shape and size of thereof as illustrated in FIG. 8.

Figure 8:
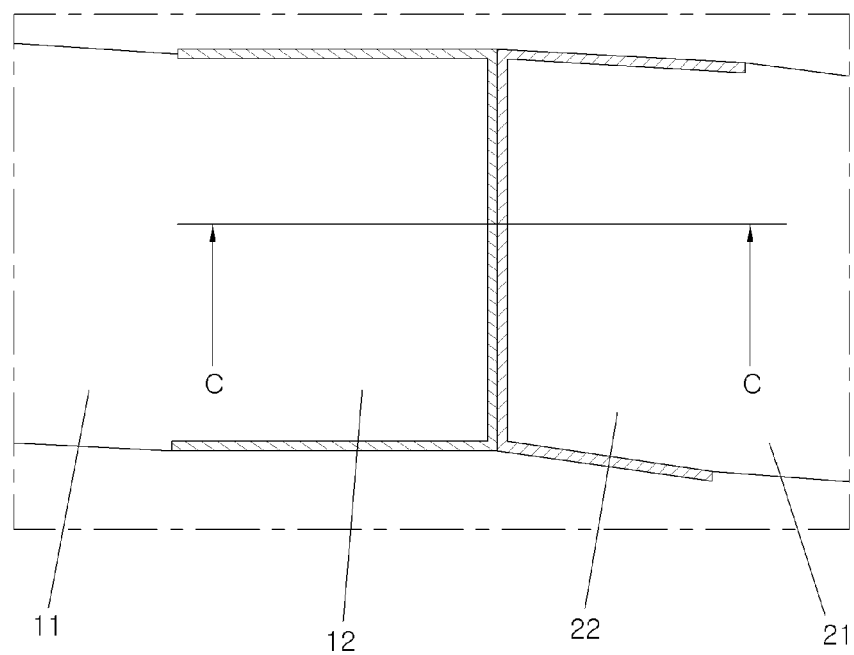
FIG. 8 is an enlarged view illustrating the coupling part of FIG. 7 according to an exemplary embodiment of the present disclosure.
Figure 9:
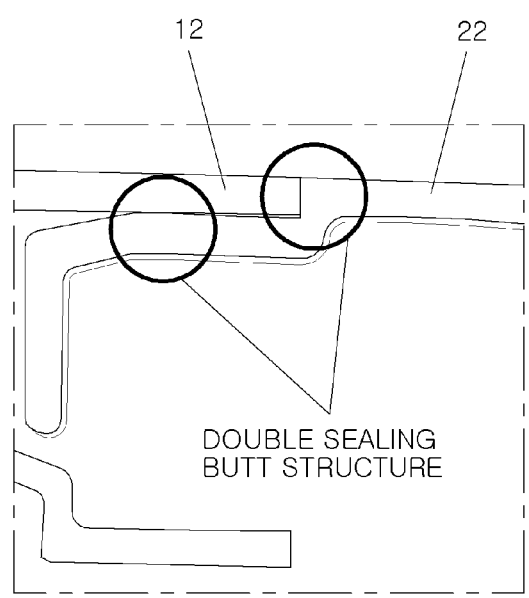
FIG. 9 is a cross-sectional view taken along line D-D of FIG. 8 according to an exemplary embodiment of the present disclosure.

As shown in FIG. 9 illustrating the section D-D of FIG. 8, since a double sealing butt structure is formed by contact of the coupling insert 22-2 with the inner surface of the center coupling part 12 and contact between the center coupling part 12 and the coupling body 22-1, it may be possible to further improve sealing performance and robustness. Although the side coupling part 22 of the side strip 20 is described as being inserted into the center coupling part 12 of the center strip 10 in the exemplary embodiment of the present disclosure, the coupling structure may also be formed in the opposite way.

In other words, the center strip 10 may be formed with a center coupling part having a coupling insert 22-2 that protrudes laterally, and the coupling insert of the center strip may be inserted into a side coupling part open laterally at one side of the side strip 20. In addition, the coupling insert 22-2 may be chamfered at the upper or lower surface or side surface thereof for easy coupling as illustrated in FIG. 6. An example of the present disclosure illustrates that the coupling insert is chamfered at the upper and lower surfaces thereof.

Meanwhile, the center body 11 of the center strip 10 and the side body 21 of the side strip 20 or 30 may be made of a material such as EPDM having a predetermined elastic force and sealing property in a strip shape by an extrusion process. The center coupling part 12 may be formed integrally with the center body 11 by an injection process and the side coupling part 22 may be formed integrally with the side body 21 by an injection process. In each of the pair of side strips 20 and 30, the end piece 23 may be formed integrally with the side body 21 at one end thereof by injection molding.

As described above, the center coupling part, the side coupling part, and the end piece of the hood weather strip assembly of the present disclosure may be integrated with respective bodies by injection molding unlike the conventional ones. Therefore, it may be possible to increase merchantability in appearance and improve robustness by enhanced bonding force.

Figure 10:
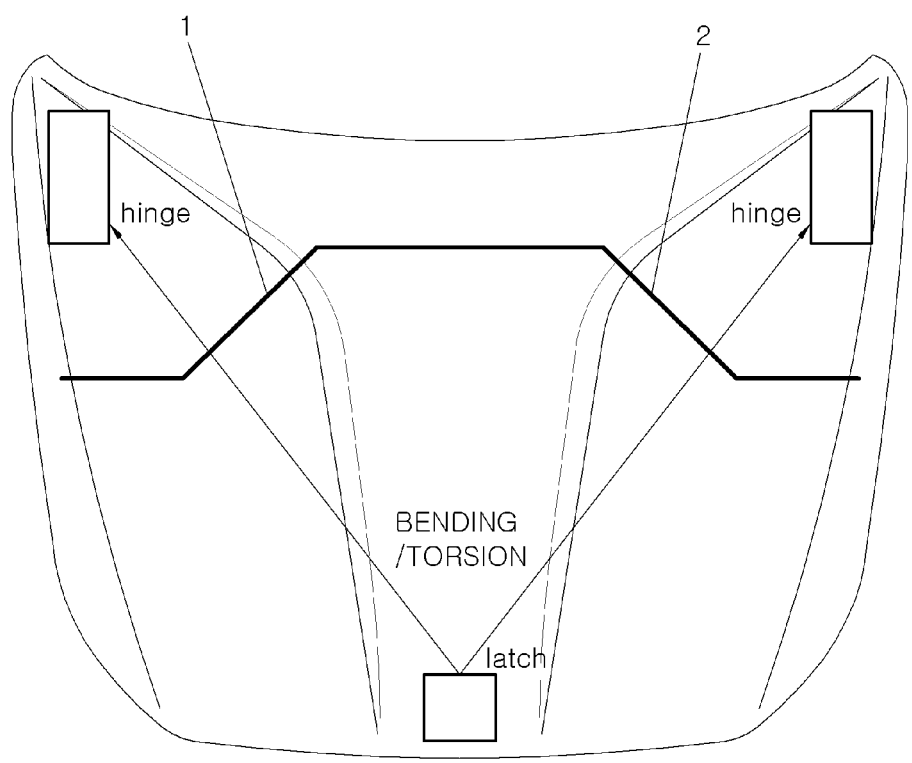
FIGS. 10 and 11 are views illustrating the bending/torsional moment by the conventional hood weather strip according to the related art.
Figure 11:
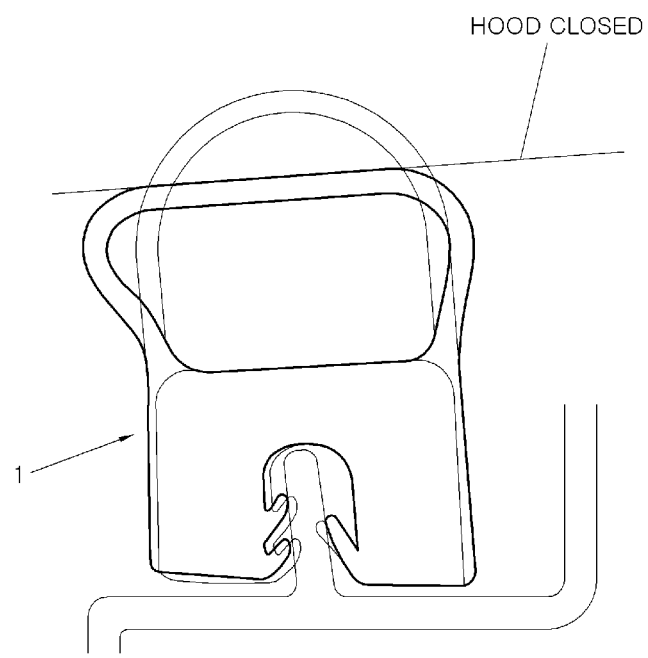
Figure 12:
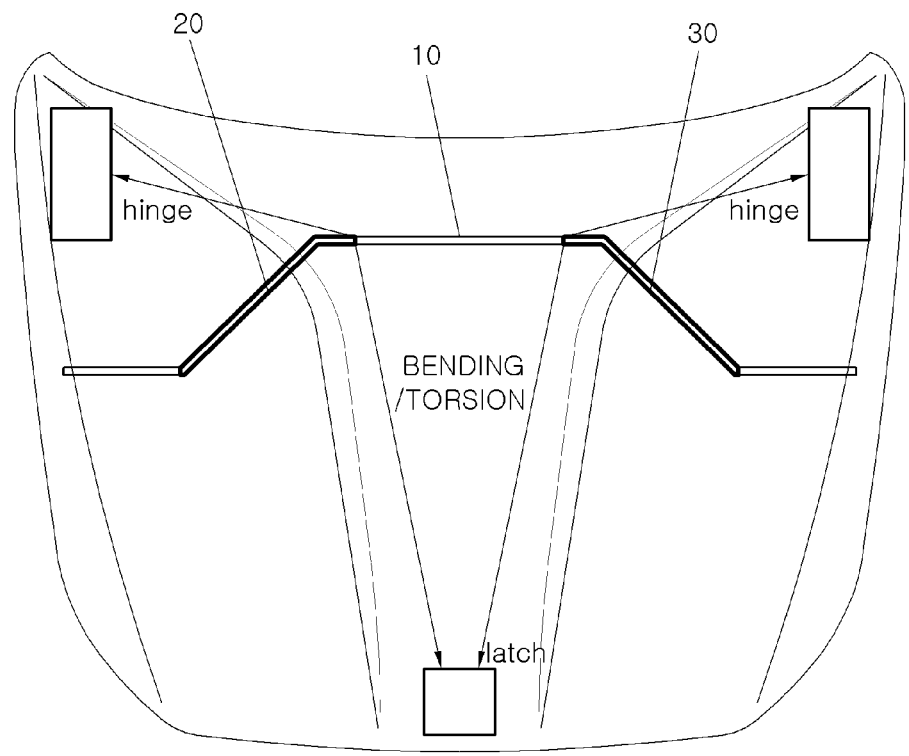
FIG. 12 is a view illustrating the bending/torsional moment by the hood weather strip assembly according to an exemplary embodiment of the present disclosure.

FIGS. 10 and 11 are views illustrating the bending/torsional moment by the conventional hood weather strip. FIG. 12 is a view illustrating the bending/torsional moment by the hood weather strip assembly of the present disclosure. Referring to the drawings, the bending/torsional moment value is much larger in the present disclosure illustrated in FIG. 12.

In the related art of FIG. 10, the bending stiffness of the weather strip is deteriorated since the portion where the weather strip is pressed at an angle of inclination by the hood inner panel is deformed in a direction away from the hinge (e.g., fixed point). However, in the present disclosure, the hood weather strip assembly is resistant to bending and torsion since the fitting structure is applied to the coupling part between the weather strips and the hood weather strip assembly is endured in a direction opposite to the closed direction.

The sealing performance and robustness of the hood weather strip assembly according to the present disclosure may further be improved by the double sealing structure between two weather strips. The hood weather strip assembly has an excellent appearance and does not cause dynamic behavior of the hood since it is not structured to simply cover the gap between two weather strips. The hood weather strip assembly reduces the torsional moment of the vehicle body, compared with having a simple covering structure.

While the present disclosure has been described with respect to the specific exemplary embodiments, it will be apparent to those skilled in the art that various changes and modifications may be made without departing from the spirit and scope of the disclosure as defined in the following claims.

What is claimed is:

1. A hood weather strip assembly, comprising:
a center strip fixed to a cowl top cover; and
a pair of side strips coupled to each end of the center strip and fixed to fender side covers, respectively,
wherein the center strip includes a center body and center coupling parts formed at both ends of the center body, and the center coupling parts are open laterally,
wherein each of the side strips includes:
a side body; and
a side coupling part formed at a first end of the side body to be coupled to an associated one of the center coupling parts,
wherein the side coupling part includes:
a coupling body having a same outer peripheral shape as the side body; and
a coupling insert that protrudes laterally from one side of the coupling body,
having an outer periphery smaller than the coupling body, and inserted into the associated center coupling part, and
wherein each of the center coupling parts includes a guide protrusion that protrudes upwardly from an inner lower side of each of the center coupling parts, the guide protrusion being formed along a length direction of the center strip.

2. The hood weather strip assembly of claim 1, wherein each of the center coupling parts has a same outer peripheral shape as the center body.

3. The hood weather strip assembly of claim 1, wherein the coupling insert is chamfered.

4. The hood weather strip assembly of claim 3, further comprising:
an end piece formed integrally with a second end of the side body by injection molding.

* * * * *